United States Patent
Abe

(10) Patent No.: US 10,232,672 B2
(45) Date of Patent: Mar. 19, 2019

(54) WINTER TIRE

(71) Applicant: SUMITOMO RUBBER INDUSTRIES, LTD., Kobe-shi, Hyogo (JP)

(72) Inventor: Shotaro Abe, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 358 days.

(21) Appl. No.: 15/146,289

(22) Filed: May 4, 2016

(65) Prior Publication Data

US 2016/0347123 A1 Dec. 1, 2016

(30) Foreign Application Priority Data

May 26, 2015 (JP) .................................. 2015-106104

(51) Int. Cl.
*B60C 11/16* (2006.01)
*B60C 11/03* (2006.01)
*B60C 11/11* (2006.01)
*B60C 11/13* (2006.01)
*B60C 11/12* (2006.01)

(52) U.S. Cl.
CPC ........ *B60C 11/1625* (2013.01); *B60C 11/032* (2013.01); *B60C 11/0302* (2013.01); *B60C 11/0306* (2013.01); *B60C 11/0309* (2013.01); *B60C 11/0332* (2013.01); *B60C 11/11* (2013.01); *B60C 11/1218* (2013.01); *B60C 11/1236* (2013.01); *B60C 11/1307* (2013.01); *B60C 11/1369* (2013.01); *B60C 11/1637* (2013.01); *B60C 2011/0334* (2013.01); *B60C 2011/133* (2013.01)

(58) Field of Classification Search
CPC . B60C 11/0302; B60C 11/0306; B60C 11/03; B60C 11/11; B60C 11/1625; B60C 11/1637; B60C 11/06; B60C 11/16; B60C 11/032
USPC ...... 152/209.15, 209.28, 210, 211; D12/533, D12/536, 608
See application file for complete search history.

(56) References Cited

U.S. PATENT DOCUMENTS

2011/0308680 A1  12/2011  Numata
2017/0144490 A1*  5/2017  Maejima ............. B60C 11/1637

FOREIGN PATENT DOCUMENTS

EP   3081400     * 10/2016  ............. B60C 11/16
JP   2012-1120 A    1/2012
WO  WO 2015/098547  *  7/2015  ............. B60C 11/16

* cited by examiner

*Primary Examiner* — Eric Hug
(74) *Attorney, Agent, or Firm* — Birch, Stewart, Kolasch & Birch LLP

(57) ABSTRACT

A winter tire includes a tread portion with a designated rotational direction. The tread portion is provided with at least one central block on a tire equator. The central block includes a first tapered portion. The first tapered portion includes an axial width gradually decreasing toward the rotational direction and a leading edge extending along an axial direction of the tire. The first tapered portion is provided with a hole for installing a stud pin.

11 Claims, 5 Drawing Sheets

＃ WINTER TIRE

BACKGROUND ART

Field of the Invention

The present invention relates to winter tires, and in particular to a winter tire capable of improving driving performance on snow and ice.

Description of the Related Art

Japanese Unexamined Patent Application Publication No. 2012-001120 discloses a winter tire that includes a tread portion provided with a continuously extending central rib and a plurality of blocks with holes for installing a stud pin.

Unfortunately, such a winter tire as disclosed in the above document would have less traction available on snow and ice due to the central rib that does not contribute to increase snow-shearing force. Furthermore, there is room for improvement on arrangement of the holes for installing a stud pin in the winter tire disclosed in the above document.

SUMMARY OF THE INVENTION

In view of the above problems in the conventional art, the present invention has an object to provide a winter tire capable of improving driving performance on snow and ice.

According to one aspect of the invention, a winter tire includes a tread portion with a designated rotational direction. The tread portion is provided with at least one central block on a tire equator. The at least one central block includes a first tapered portion. The first tapered portion includes an axial width gradually decreasing toward the rotational direction and a leading edge extending along an axial direction of the tire. The first tapered portion is provided with a hole for installing a stud pin.

In another aspect of the invention, a stud pin may be fixed to the hole.

In another aspect of the invention, the center of the hole may be located within a region where the leading edge is projected along a circumferential direction of the tire, in a plan view of the tread portion.

In another aspect of the invention, the at least one central block may further include a second tapered portion having a width gradually decreasing toward a direction opposite to the rotational direction so as to form a triangle shape.

In another aspect of the invention, the at least one central block may further include a main portion between the first tapered portion and the second tapered portion, and the main portion may include an axial edge extending in parallel with the axial direction of the tire at least partially.

In another aspect of the invention, the second tapered portion may include a pair of inclined side edges extending from a trailing end of the second tapered portion, and the pair of inclined side edges may be inclined in the same direction with respect to a circumferential direction of the tire.

In another aspect of the invention, the tread portion may include a first tread edge, and the at least one central block may include a first central block including the inclined side edges extending toward the first tread edge in the direction opposite to the rotational direction.

In another aspect of the invention, an axially outer side edge in the inclined side edges of the first central block may extend in a straight manner from the trailing end to the leading edge.

In another aspect of the invention, the tread portion may include a second tread edge, and the at least one central block may include a second central block including the inclined side edges extending toward the second tread edge in the direction opposite to the rotational direction.

In another aspect of the invention, an axially outer side edge in the inclined side edges of the second central block may extend in a straight manner from the trailing end to the leading edge.

In another aspect of the invention, the first central block and the second central block may be arranged alternately in the circumferential direction of the tire.

DESCRIPTION OF THE PREFERRED EMBODIMENTS

Figure 1:
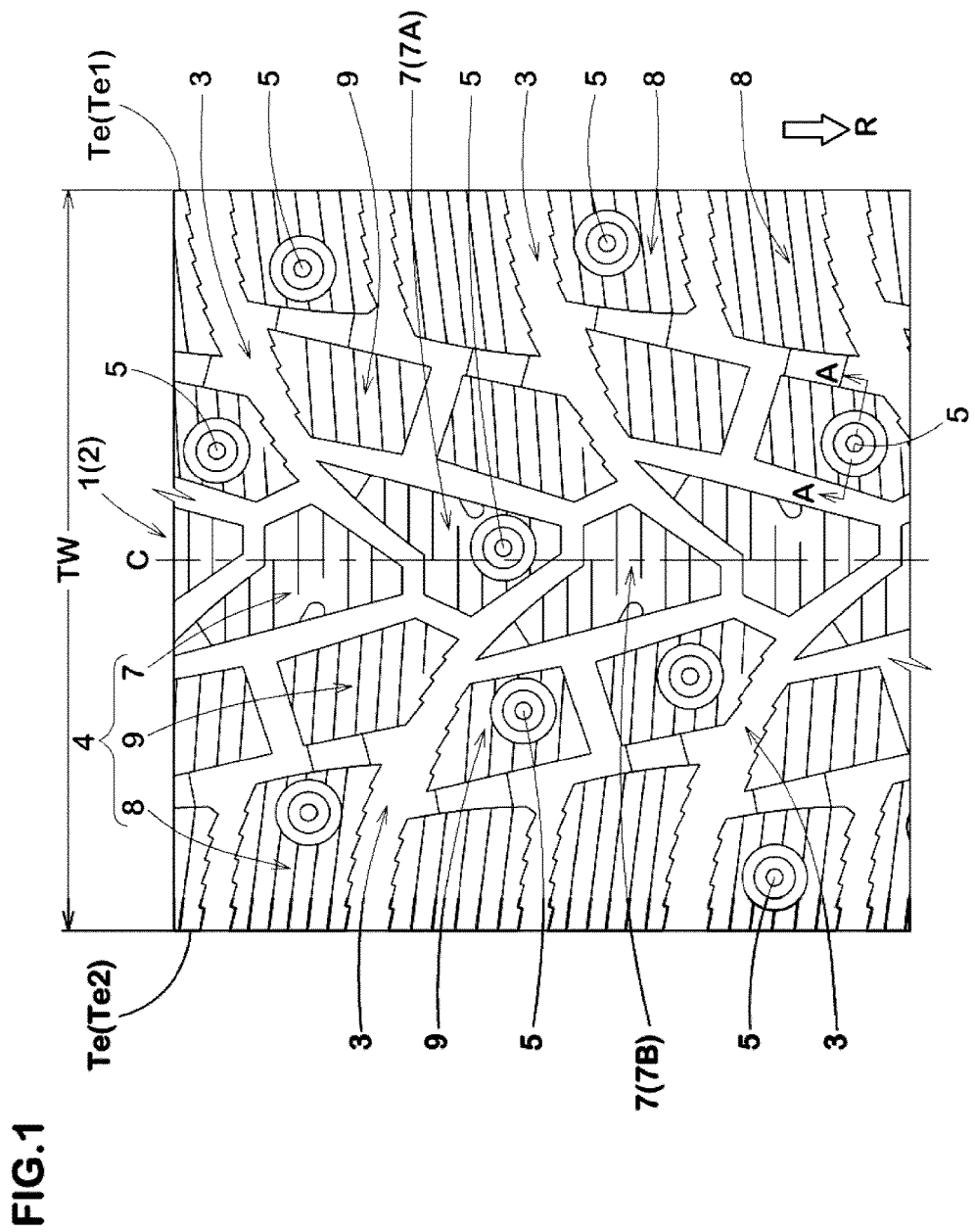
FIG. 1 is a development view of a tread portion of a winter tire according to an embodiment of the present invention.

An embodiment of the present invention will be explained below with reference to the accompanying drawings. FIG. 1 illustrates a development view of a tread portion 2 of a winter tire 1 according to an embodiment of the present invention. In a preferred embodiment, the winter tire 1 illustrated in FIG. 1 is embodied as a tire for passenger cars.

As illustrated in FIG. 1, the tread portion 2 of the tire 1 in accordance with the present embodiment includes a tread pattern having a designated rotational direction R, for example. The rotational direction R may be indicated on a sidewall portion (not illustrated) of the tire using characters or a sign, for example.

The tread portion 2 is provided with a plurality of grooves 3 and a plurality of blocks 4. In this embodiment, at least one of the blocks 4 is provided with a hole 5 for installing the stud pin. Preferably, a plurality of holes 5 may be arranged on the tread portion 2 in a random pattern.

Figure 2A:
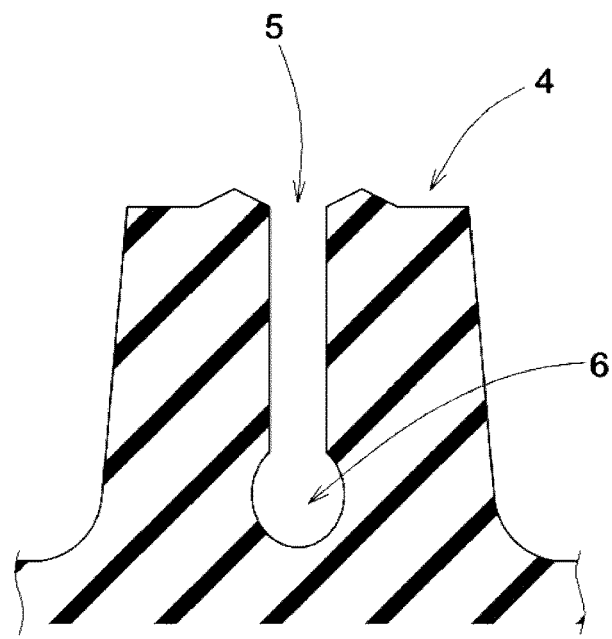
FIG. 2A is a cross sectional view taken along a line A-A of FIG. 1.
Figure 2B:
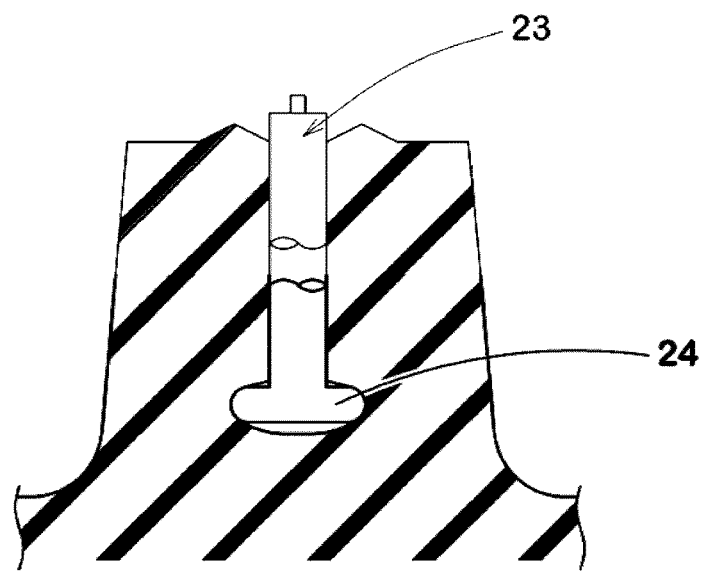
FIG. 2B is a cross sectional view of the above in associated with a stud pin.

FIG. 2A illustrates a cross sectional view of one of the holes 5 taken along a line A-A of FIG. 1, and FIG. 2B is a cross sectional view of the above in associated with a stud pin. As illustrated in FIGS. 2A and 2B, the hole 5, for example, includes a bottom portion 6 having an enlarged internal diameter with which a bottom flange portion 24 of a stud pin 23 may engage. This hole structure would improve holding performance of the stud pin 23.

As illustrated in FIG. 1, the blocks 4, for example, include at least one central blocks 7 disposed on the tire equator C, at least one shoulder block 8 disposed on the side of one of tread edges Te and at least one middle block 9 disposed between the central block 7 and the shoulder block 8. In this embodiment, a plurality of central blocks 7, shoulder blocks 8 and middle blocks 9 are arranged in the circumferential direction of the tire to form a central block row, shoulder block row and a middle block row, respectively.

The tread edges Te include a first tread edge Te1 (the right side in FIG. 1) and a second tread edge Te2 (the left side in the), for example. As used herein, the tread edges Te1 and Te2 refer to the axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Unless otherwise noted, dimensions of respective portions of the tire are values specified in a normally inflated unloaded condition such that the tire 1 is mounted on the standard wheel rim with the standard pressure, but is loaded with no tire load.

Figure 3:
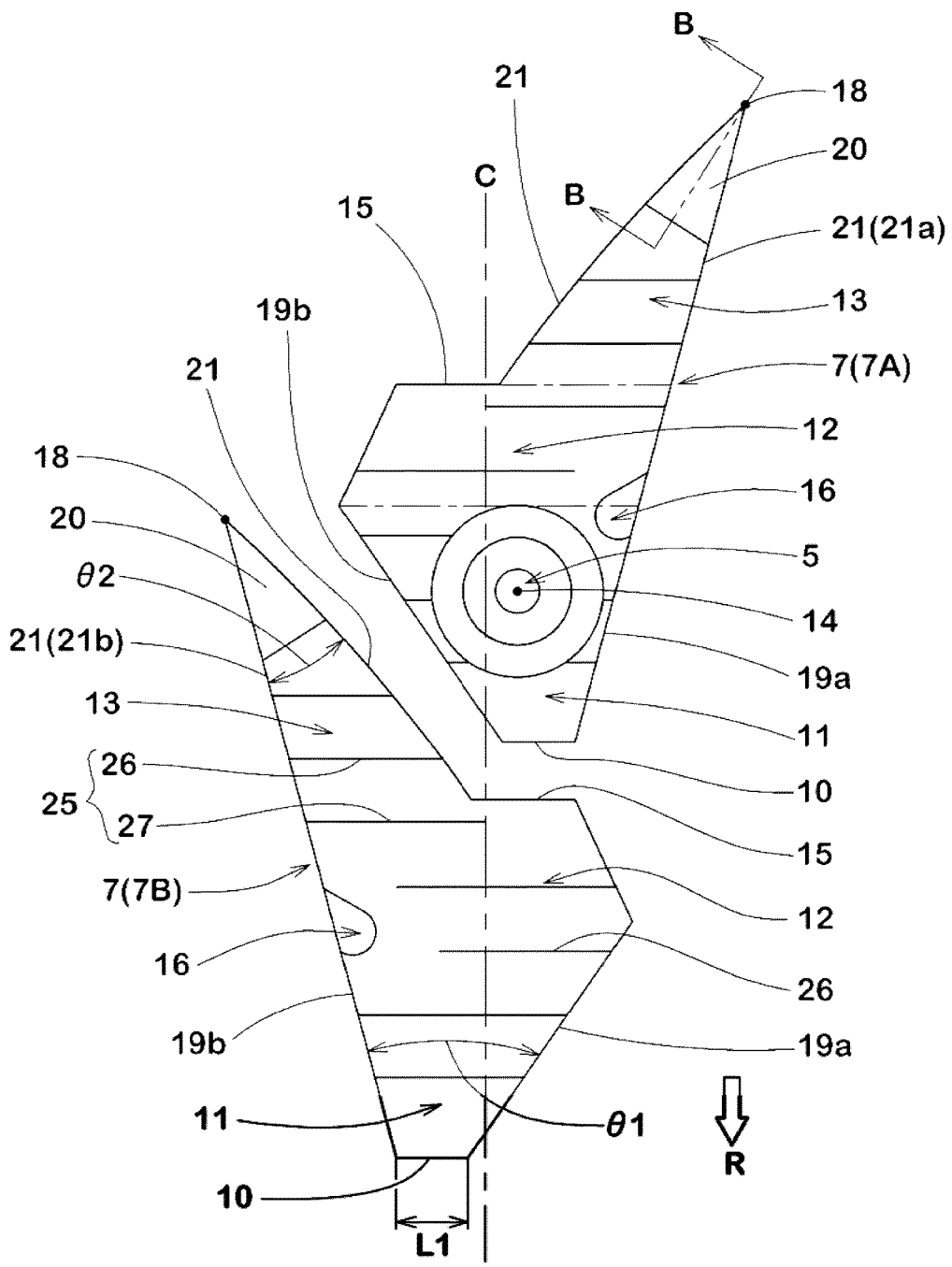
FIG. 3 is an enlarged view of a central block of FIG. 1.

FIG. 3 illustrates an enlarged view of two central blocks 7 of FIG. 1. As illustrated in FIG. 3, at least one central block 7 includes a first tapered portion 11.

The first tapered portion 11 is located on the side of a leading edge 10 of the block in the rotational direction R. In addition, the first tapered portion 11 has an axial width gradually decreasing toward the rotational direction R and the leading edge 10 extending along an axial direction of the tire. Furthermore, the first tapered portion 11 is provided with at least one of the holes 5 for installing a stud pin.

When the tire 1 comes into contact with snowy road, a tread groove between adjacent central blocks 7 arranged on the tire equator C would compress snow using a large ground contact pressure acted thereto, and then would shear it to increase snow traction. Furthermore, the axially extending leading edge 11 of the central block 7 of the tapered portion 11 may generate large snow traction while pushing the compressed snow out from the groove toward axially both sides to prevent the groove from clogging up with snow.

Furthermore, when a stud pin is fitted into the hole 5, apparent rigidity of the first tapered portion 11 of the central block 7 can be enhanced. Since the tapered portion 11 would deform hardly when coming into contact with the ground, the stud pin would be in contact with the ground surely to increase traction on ice. In particular, since the axially extending leading edge 10 can reduce deformation of the central block 7 in the right and left side directions when coming into contact with the ground, the stud pin would be in contact with the ground in substantially vertical manner. Thus, the tire in accordance with the present embodiment would offer an excellent on-snow and on-ice performance.

Preferably, the center 14 of the hole 5 is located within a region where the leading edge 10 is projected along the circumferential direction of the tire, in a plan view of the tread portion 2. This structure may further improve the effects described above.

Preferably, the first tapered portion 11, for example, includes a pair of side edges 19a and 19b inclined in an opposite direction from each other in order to further reduce deformation of the central block 7 in the right and left side directions when coming into contact with the ground.

Preferably, an angle θ1 between the side edges 19a and 19b of the first tapered portion 11 is in a range of not less than 40 degrees, more preferably not less than 45 degrees, but preferably in a range of not more than 60 degrees, more preferably not more than 55 degrees in order to further improve on-snow and on-ice performance while ensuring holding performance of the stud pin.

In the same point of view, an axial length LI of the leading edge 10 is preferably in a range of not less than 2.0%, more preferably not less than 3.0%, but preferably in a range of not more than 5.0%, more preferably not more than 4.0% of the tread width TW (illustrated in FIG. 1). The tread width TW is defined as an axial distance between the first tread edge Te1 and the second tread edge Te2 under the normally inflated unloaded condition.

Referring back to FIG. 3, the central blocks 7, for example, further includes a second tapered portion 13 and a main portion 12 formed between the first tapered portion 11 and the second tapered portion 13.

The second tapered portion 13, for example, is configured as a triangle shape having a width gradually decreasing toward the direction opposite to the rotational direction R to the trailing end 18. The second tapered portion 13 may increase circumferential edge components of the central block 7, and thus would improve cornering performance on snow and ice.

The second tapered portion 13 includes a pair of inclined side edges 21 and 21 each extending from the trailing end 18 toward the rotational direction R. In a preferred embodiment, the inclined side edges 21 and 21 are inclined in the same direction with respect to the circumferential direction of the tire. The second tapered portion 13 is configured to be flexible to deform in the right and left side directions when ground contact pressure acts on the central block 7 so that snow introduced in grooves can easily be dropped off therefrom during traveling.

Preferably, an angle θ2 between the pair of inclined side edges 21 and 21 is in a range of not less than 20 degrees, more preferably not less than 25 degrees, but preferably in a range of not more than 40 degrees, more preferably not less than 35 degrees in order to increase circumferential edge components of the second tapered portion 13 while ensuring rigidity thereof.

Figure 4:
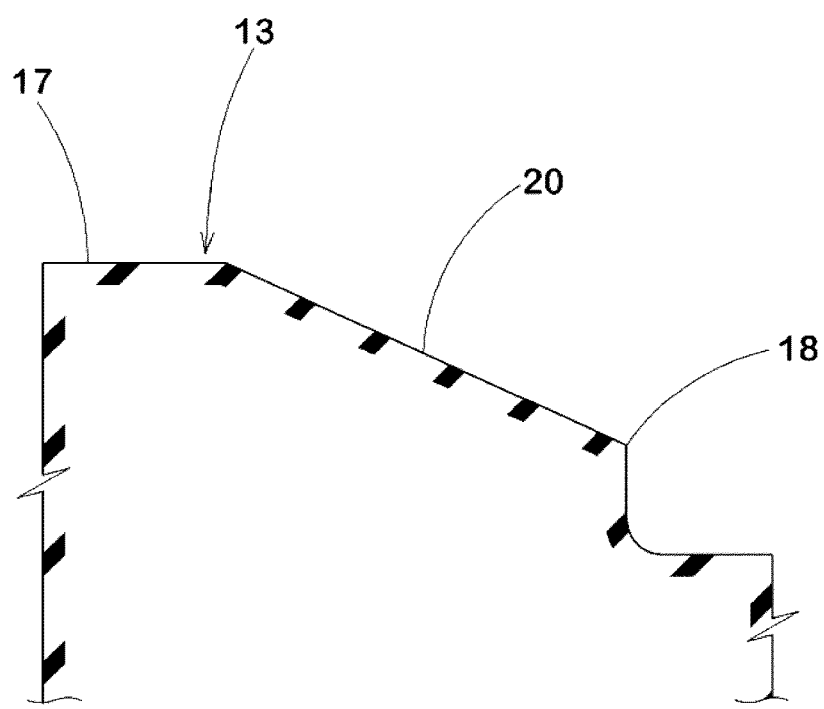
FIG. 4 is a cross-sectional view taken along a line B-B of FIG. 3.

FIG. 4 illustrates a cross-sectional view taken along a line B-B of FIG. 3. As illustrated in FIG. 4, the second tapered portion 13 preferably includes a slope surface 20 that extends radially inwardly with an inclination from a ground contact surface 17 to the trailing end 18. This would prevent the trailing edge 18 of the second tapered portion 13 from uneven wear as well as chipping to be generated thereon.

As illustrated in FIG. 3, the main portion 12, for example, is configured to have a substantially quadrangle shape, more preferably as a substantially parallelogram shape. The main portion 12 preferably includes an axially extending edge 15 at least partially to increase traction on ice.

Preferably, the central blocks 7 include at least one first central block 7A and at least one second central block 7B. For example, the first central block 7A and the second central block 7B are arranged alternately in the circumferential direction of the tire.

The first central block 7A includes the inclined side edges 21 and 21 each inclining toward the first tread edge Te1 in the direction opposite to the rotational direction R. In a preferred embodiment, an axially outer side edge 21a in the inclined side edges 21 of the first central block 7A may extend in a straight manner from the trailing end 18 to the leading edge 10.

The second central blocks 7B includes the inclined side edges 21 and 21 each inclining toward the second tread edge Te2 in the direction opposite to the rotational direction R. In a preferred embodiment, an axially outer side edge 21*b* in the pair of inclined side edges 21 of the second central block 7B may extend in a straight manner from the trailing end 18 to the leading edge 10.

The first central blocks 7A and the second central blocks 7B would be helpful to increase friction on axially both sides of the tire in good balance when traveling on ice.

Preferably, each of the central blocks 7 is provided with a plurality of central sipes 25. The respective sipe edges of the central sipes 25 further increase friction on ice.

The central sipes 25, for example, include a first central sipes 26 that perfectly traverses the central block 7 in the axial direction of the tire and a second central sipe 27 that includes one end opening to a groove and the other end terminating within the central block 7.

Preferably, the first central sipe 26 is provided on the first tapered portion 11 and/or the second tapered portion 13. Preferably, the second central sipe 27 is provided on the main portion 12. This sipe structure may give the tapered portions 11 and 13 an excellent scratch effect. Furthermore, the main portion 12 with relatively large rigidity may prevent the tapered portions 11 and 13 from deforming excessively. Thus, the tire in accordance with the present embodiment would further improve on-ice and on-snow performance.

Preferably, each central block 7, for example, may be provided with a recess 16 where the ground contact surface and sidewall of the block are recessed in order to further increase snow traction.

Preferably, the total number Nc of holes 5 for installing a stud pin on the central blocks 7 is in a range of not less than 10%, more preferably not less than 13%, but preferably not more than 20%, more preferably not more than 17% of the total number Nt of the holes 5 for a stud pin provided on the entire tread portion 2 in order to further improve on-ice and on-snow performance of the tire while ensuring holding performance of stud pins.

Figure 5:
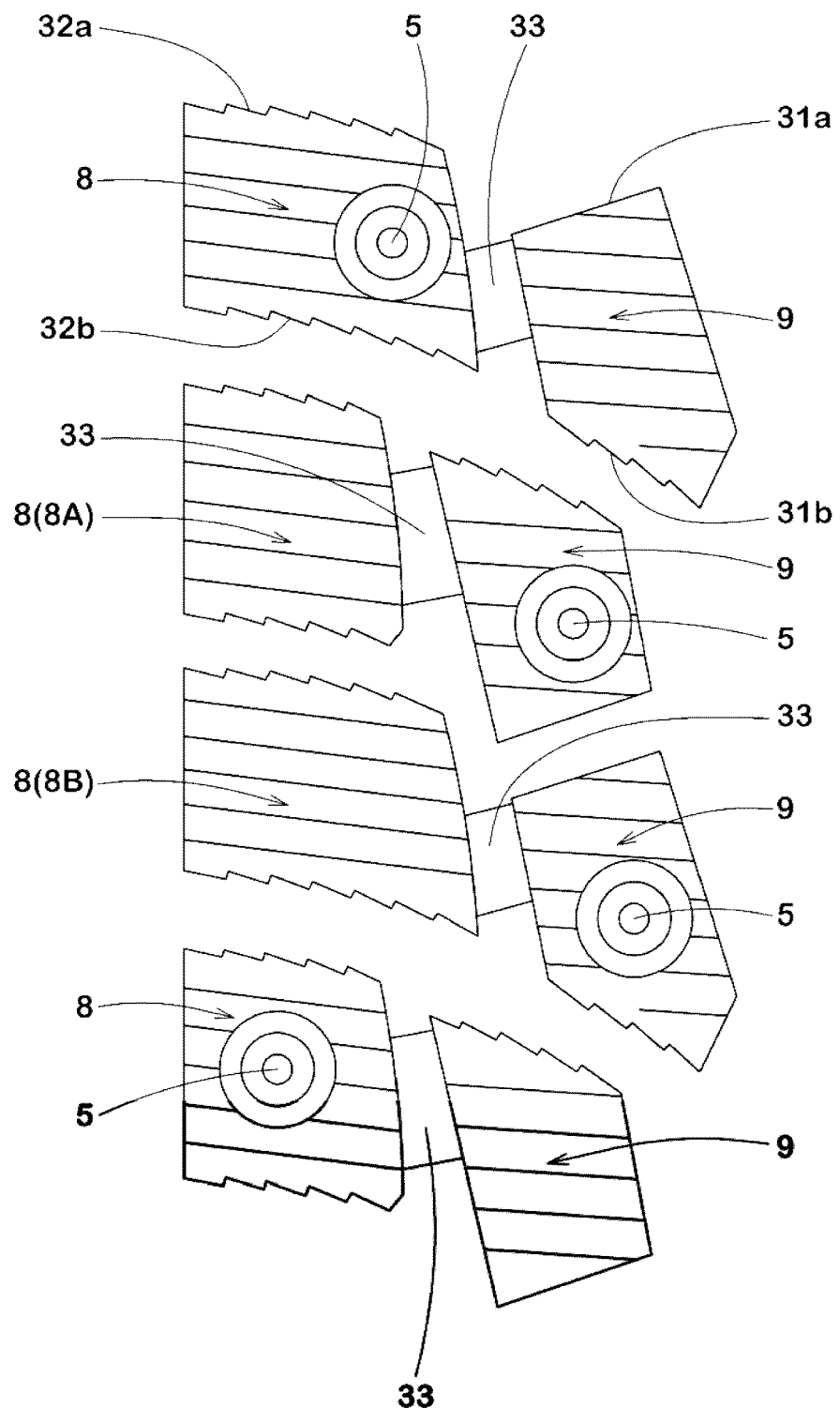
FIG. 5 is an enlarged view of the left side tread portion of FIG. 1 including a middle block and a shoulder block.

FIG. 5 illustrates an enlarged view of the left side tread portion of FIG. 1 including middle blocks 9 and shoulder blocks 8. As illustrated in FIG. 5, the middle blocks 9 and the shoulder blocks 8 are spaced in the circumferential direction of the tire.

The middle blocks 9, for example, are configured to have a ground contact surface in a quadrangle or pentagon shape. Each of the middle blocks 9 includes a leading edge 31*b* and trailing edge 31*a* which are inclined relative to the axial direction of the tire. At least one of the edges 31*a* and 31*b* is configured as a zigzag shape. In this embodiment, the leading edges 31*b* of the middle blocks 9 extend in the zigzag shape, and the trailing edges 31*a* of the middle blocks 9 extend in a straight shape in order to further improve driving performance on snow and ice while preventing uneven wear of the blocks 9.

Preferably, the total number Nm of holes 5 for installing a stud pin provided on the middle blocks 9 is greater than the above mentioned total number Nc. This would further be helpful to increase traction on ice. The total number Nm is preferably in a range of not less than 20%, more preferably not less than 25%, but preferably not more than 40%, more preferably not more than 35% of the total number Nt in order to further improve on-ice and on-snow performance of the tire.

The shoulder blocks 8, for example, are configured to have a ground contact surface in a quadrangle shape. Each of the shoulder blocks 8, for example, includes a leading edge 32*b* and a trailing edge 32*a* which extend substantially in the axial direction of the tire and which are configured as a zigzag shape. These shoulder blocks 8 would offer an excellent wandering resistance performance on a rutted icy road.

The shoulder blocks 8, for example, include a first shoulder block 8A and a second shoulder block 8B which have a different axial width from each other. In a preferred embodiment, the first the shoulder block 8A and the second shoulder block 8B are arranged alternately in the circumferential direction of the tire. Since these shoulder blocks deform in different amount when receiving a ground contact pressure, this action would be useful to remove snow from grooves disposed between shoulder blocks during traveling.

In a preferred embodiment, one of the shoulder blocks 8 having at least one hole 5 for installing a stud pin may be disposed next to one of the middle blocks 8 that is not provided with any holes 5. Furthermore, one of the shoulder blocks 8 having no hole 5 for installing a stud pin may be disposed next to one of the middle blocks 8 that is provided with at least one hole 5. This structure would increase contact pressure of the respective stud pins to icy road by dispersing the pins suitably, thereby improving on-ice performance of the tire.

Preferably, the total number Ns of holes 5 for installing a stud pin provided on the shoulder blocks 8 is greater than the above mentioned total number Nc, more preferably greater than the total number Nm.

Preferably, the total number Ns is in a range of not less than 40%, more preferably not less than 45%, but preferably not more than 60%, more preferably not more than 55% of the total number Nt.

Preferably, a groove between a pair of axially adjacent middle block 9 and shoulder block 8 is provided with at least one tie-bar 33 in which a groove bottom rises. The tie-bar 33 may suppress a large deformation of the middle block 9 and the shoulder block 8 when coming into contact with the ground, and thus it would improve steering stability on ice.

While the particularly preferable embodiments in accordance with the present invention have been described in detail, the present invention is not limited to the illustrated embodiments, but can be modified and carried out in various aspects.

EXAMPLE

Winter tires for passenger cars 205/60R16 having a basic tread pattern illustrated in FIG. 1 were manufactured based on the details shown in Table 1. In each example tire, all the holes for installing a stud pin provided on central blocks are located on first tapered portions. As for a comparative example, a winter tire having the basic tread pattern as illustrated in FIG. 1 was also manufactured, wherein all the holes for installing a stud pin provided on central blocks is located on main portions of the central blocks. Then, on-snow and on-ice performance and holding performance of a stud pin of each test tire were tested. The common specification and the test methods are as follows.

Rim: 16×6.5
Tire inner pressure: Front 240 kPa, Rear 220 kPa
Test vehicle: Front wheel drive car with displacement of 2,000 cc
Tire installing location: All the wheels On-snow Performance Test:

The lap time for the test vehicle to travel an oval test course with a road covered with compressed snow and ice. The results are indicated in Table 1 using an index based on the result of Ref. 1 being 100. The smaller the value, the better the performance is.

Holding Performance of Stud Pin Test:

After the test vehicle traveled a certain distance, the number of stud pins that was dropped out from the central blocks was counted. The results are indicated in Table 1 using an index based on the result of Ref. 1 being 100. The smaller the value, the better the performance is.

Table 1 shows the test results that the example winter tires offered an excellent on-snow and on-ice performance.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Leading edge axial length L1/Tread width TW (%) | 3.5 | 3.5 | 3.5 | 3.5 | 3.5 | 3.5 | 2.0 | 3.0 | 4.0 | 5.0 |
| First tapered portion angle $\theta_1$ (deg.) | 50 | 50 | 40 | 45 | 55 | 60 | 50 | 50 | 50 | 50 |
| On-snow and on-ice performance (Index) | 100 | 93 | 93 | 93 | 94 | 95 | 95 | 94 | 93 | 94 |
| Holding performance of stud pin (Index) | 100 | 87 | 91 | 89 | 87 | 87 | 91 | 91 | 87 | 87 |

What is claimed is:

1. A winter tire comprising:
   a tread portion having a designated rotational direction, the tread portion being provided with at least one central block on a tire equator;
   the at least one central block comprising a first tapered portion;
   the first tapered portion comprising an axial width gradually decreasing toward the rotational direction and a leading edge extending along an axial direction of the tire; and
   the first tapered portion being provided with a hole for installing a stud pin.

2. The winter tire according to claim 1, wherein a stud pin is fixed to the hole.

3. The winter tire according to claim 1, wherein the center of the hole is located within a region where the leading edge is projected along a circumferential direction of the tire, in a plan view of the tread portion.

4. The winter tire according to claim 1, wherein the at least one central block further comprises a second tapered portion having a width gradually decreasing toward a direction opposite to the rotational direction so as to form a triangle shape.

5. The winter tire according to claim 4, wherein the at least one central block further comprises a main portion between the first tapered portion and the second tapered portion, and the main portion comprises an axial edge extending in parallel with the axial direction of the tire at least partially.

6. The winter tire according to claim 4, wherein the second tapered portion includes a pair of inclined side edges extending from a trailing end of the second tapered portion, and the pair of inclined side edges are inclined in the same direction with respect to a circumferential direction of the tire.

7. The winter tire according to claim 6, wherein the tread portion comprises a first tread edge, and the at least one central block comprises a first central block comprising the inclined side edges extending toward the first tread edge in the direction opposite to the rotational direction.

8. The winter tire according to claim 7, wherein an axially outer side edge in the inclined side edges of the first central block extends in a straight manner from the trailing end to the leading edge.

9. The winter tire according to claim 7, wherein the tread portion comprises a second tread edge, and the at least one central block comprises a second central block comprising the inclined side edges extending toward the second tread edge in the direction opposite to the rotational direction.

10. The winter tire according to claim 9, wherein an axially outer side edge in the inclined side edges of the second central block extends in a straight manner from the trailing end to the leading edge.

11. The winter tire according to claim 9, wherein the first central block and the second central block are arranged alternately in the circumferential direction of the tire.

* * * * *